(12) United States Patent
Lee et al.

(10) Patent No.: US 12,336,548 B2
(45) Date of Patent: Jun. 24, 2025

(54) GUMMY CONFECTIONERY-COATED NON-EDIBLE CONTAINER

(71) Applicant: ZURU (SINGAPORE) PTE. LTD., Singapore (SG)

(72) Inventors: Chung Hyun Lee, Seoul (KR); David Johnston Smith, Auckland (NZ); Diwata Katrina Dinglasa Santillan, Auckland (NZ); Ethan Luke Harrold, Auckland (NZ); Ethan Hutchinson, Dairy Flat (NZ)

(73) Assignee: ZURU EDGE LIMITED, Kowloon (HK)

( * ) Notice: Subject to any disclaimer, the term of this patent is extended or adjusted under 35 U.S.C. 154(b) by 511 days.

(21) Appl. No.: 17/632,165

(22) PCT Filed: Aug. 7, 2020

(86) PCT No.: PCT/SG2020/050461
§ 371 (c)(1),
(2) Date: Feb. 1, 2022

(87) PCT Pub. No.: WO2021/029826
PCT Pub. Date: Feb. 18, 2021

(65) Prior Publication Data
US 2022/0279810 A1    Sep. 8, 2022

(30) Foreign Application Priority Data

Aug. 9, 2019 (NZ) .......................... 756215

(51) Int. Cl.
A23G 3/54    (2006.01)
B65D 8/00    (2006.01)

(52) U.S. Cl.
CPC .............. *A23G 3/545* (2013.01); *B65D 11/02* (2013.01)

(58) Field of Classification Search
CPC ................................ A23G 3/563; A23G 3/545
See application file for complete search history.

(56) References Cited

U.S. PATENT DOCUMENTS

| 294,575 A | 3/1884 | Britton |
| 1,423,122 A | 7/1922 | Kyriazopoulos |

(Continued)

FOREIGN PATENT DOCUMENTS

| CA | 55176 A | 5/1897 |
| CA | 78812 A | 12/1902 |

(Continued)

OTHER PUBLICATIONS

Machine translation of KR2016078039. Publication date Jul. 4, 2016. pp. 1-22. (Year: 2016).*

(Continued)

*Primary Examiner* — Jenna A Watts
(74) *Attorney, Agent, or Firm* — FINNEGAN, HENDERSON, FARABOW, GARRETT & DUNNER, L.L.P.

(57) ABSTRACT

A confectionery product comprising of a layer of gummy confectionery, made up of one or more sections, which coat a non-edible object or container. This container is purposed to house a children's toy and support the layer of confectionery. Methods of preparing the confectionery-coated object also are provided.

16 Claims, 10 Drawing Sheets

(56) References Cited

U.S. PATENT DOCUMENTS

| | | |
|---|---|---|
| 1,651,960 A | 12/1927 | Miller |
| 2,998,896 A | 9/1961 | Miller |
| 4,106,657 A | 8/1978 | Dogliotti |
| D254,155 S | 2/1980 | Allen |
| D273,766 S | 5/1984 | Lampe |
| D312,845 S | 12/1990 | Matsuda |
| 5,287,979 A | 2/1994 | Bourgeois |
| 5,302,403 A | 4/1994 | Cook et al. |
| 5,792,496 A | 8/1998 | Fekete |
| 5,813,895 A | 9/1998 | Cho |
| 5,925,391 A | 7/1999 | Whetstone, Jr. |
| 5,942,268 A * | 8/1999 | Zimmermann ......... A23L 21/10 426/115 |
| 6,099,872 A | 8/2000 | Whetstone, Jr. |
| D441,596 S | 5/2001 | Fernandez |
| D475,288 S | 6/2003 | Hoffmann et al. |
| 6,596,334 B1 | 7/2003 | Flickinger et al. |
| 8,844,720 B2 | 9/2014 | Lantinen |
| 8,859,024 B2 | 10/2014 | Gass |
| D723,364 S | 3/2015 | Halbur et al. |
| D735,414 S | 7/2015 | Schlatter |
| D771,873 S | 11/2016 | Teller |
| 9,550,128 B1 | 1/2017 | Pruzansky et al. |
| D789,241 S | 6/2017 | Cao |
| 10,010,095 B2 | 7/2018 | Vaccarella |
| D828,031 S | 9/2018 | Bloomfield et al. |
| D854,749 S | 7/2019 | Lushefski |
| 10,610,490 B2 | 4/2020 | Stegemann et al. |
| D913,107 S | 3/2021 | You |
| 11,091,295 B2 | 8/2021 | Lushefski |
| D934,436 S | 10/2021 | Xia |
| D942,112 S | 2/2022 | Toombs |
| D966,787 S | 10/2022 | Parks |
| 2002/0033397 A1 | 3/2002 | Henson |
| 2003/0075830 A1 | 4/2003 | Sollich |
| 2004/0131751 A1 | 7/2004 | Dekker et al. |
| 2006/0222743 A1 * | 10/2006 | Bikas-Smith ......... A23G 3/563 426/112 |
| 2007/0017915 A1 | 1/2007 | Weder et al. |
| 2007/0108092 A1 | 5/2007 | Minuto et al. |
| 2011/0123687 A1 | 5/2011 | Gass |
| 2015/0210432 A1 | 7/2015 | Lam |
| 2017/0050789 A1 | 2/2017 | Loxton |
| 2017/0295839 A1 | 10/2017 | Gass |
| 2018/0206614 A1 | 7/2018 | Lushefski |
| 2018/0352829 A1 * | 12/2018 | Diamond ................. A44C 9/00 |
| 2022/0279810 A1 | 9/2022 | Lee |

FOREIGN PATENT DOCUMENTS

| | | | |
|---|---|---|---|
| CA | 84077 A | 11/1903 | |
| DE | 19735864 A1 | 4/1997 | |
| DE | 19802569 | 9/1999 | |
| DE | 20001480 U1 | 7/2000 | |
| DE | 202005020050 U1 | 4/2006 | |
| EP | 1413205 B1 | 10/2006 | |
| GB | 467476 A | 6/1937 | |
| GB | 2036006 A | 10/1979 | |
| GB | 2494889 A | 9/2011 | |
| JP | 6194439 B2 | 9/2017 | |
| KR | 100213393 B1 | 8/1999 | |
| KR | 2016078039 A * | 7/2016 | ........... A23G 3/0004 |
| KR | 1020170142439 A | 12/2017 | |
| KR | 101938630 B1 | 4/2019 | |
| KR | 101955284 B1 | 5/2019 | |
| KR | 102036208 B1 | 10/2019 | |
| WO | 97/19604 A1 | 6/1997 | |
| WO | 2015124642 A1 | 8/2015 | |
| WO | 2021029826 A1 | 2/2021 | |

OTHER PUBLICATIONS

International Search Report for Application No. PCT/SG2020/050461 mailed Oct. 7, 2020, 2 pages.

Supplementary European Search Report for U.S. Appl. No. 20/853,216 mailed Jun. 23, 2023, 11 pages.

* cited by examiner

GUMMY CONFECTIONERY-COATED NON-EDIBLE CONTAINER

CROSS-REFERENCE TO PRIOR APPLICATIONS

This application is a National Stage of PCT/SG2020/050461, filed Aug. 7, 2020, published Feb. 12, 2021 as WO 2021/029826 A1, which claims priority to New Zealand Patent Application No. 756215, filed Aug. 9, 2019, each hereby expressly incorporated by reference in its entirety.

TECHNICAL FIELD

This invention relates to the combination of an edible material with a non-edible object, particularly where the non-edible object is a container and contains a toy. The invention incorporates a layer of gelatinous gummy on the surface of the container as the edible material.

DESCRIPTION OF PRIOR ART

Numerous combinations of an edible material and a non-edible container have been described. Some examples that include confectionery-encapsulated toy containers are U.S. Pat. Nos. US20110123687A1, U.S. Pat. Nos. 5,925,391, 6,099,872, and US20170050789A1, each of which is incorporated by reference in its entirety. All patents, patent applications, published applications and publications, websites and other published materials referred to throughout the entire disclosure herein, unless noted otherwise, are incorporated by reference in their entirety.

U.S. Pat. No. US20110123687A1 describes a separable shell wherein a ridge extends along the outer surface to aid in conveying to a child that there is non-edible material below the candy coating. U.S. Pat. No. US20170050789A1 describes a divisible container that may receive a first and second confectionery coating on each respective half, wherein the divisible container includes projections around the circumference to allow the user to see that a non-edible container is beneath. In these examples, however the confectionery coating is either, firstly, in two halves, divided by the protrusion, wherein the confectionery coating is not supported by the non-edible container, relying on packaging to retain the product's form; or secondly, the protrusion is discontinuous, allowing for the two coatings to be partially connected to increase the structural integrity.

Examples of gummy confectionery forming are described in U.S. Pat. Nos. US20040131751A1 and U.S. Pat. No. 6,596,334B1, each of which is incorporated by reference in its entirety.

U.S. Pat. No. US20040131751A1 describes a process for producing outer shells of confectionery by means of using a cold member to press a mass of liquid confectionery into a mould and form said confectionery into a cup shape. U.S. Pat. No. US20040131751A1 describes a means of producing confectionery that can receive a liquid centre filling within the formed confectionery cup.

U.S. Pat. No. 6,596,334B1 describes a method of producing gelled food shapes in which a liquid confectionery solution is deposited into shaped cavities within starch powder moulds. This starch mogul technique, and more recently, machines that utilize plastic or metal moulds are the current industry standard for gummy confectionery production. These methods, however, cannot produce hollow products nor would be able to incorporate encapsulated objects within the confectionery in such a way that the location of the encapsulated object, and the form of the final product is controllable.

BACKGROUND

Surprise toy products have created a popular segment in the toy industry, and it is continuing to grow. There are two key types of surprise toys: products that contain only toys, and those that include confectionery or other food as an additional selling point. This invention's subject matter is related to the latter.

Some surprise toy confectionery products include a toy and a serving of confectionery as separately packaged items within an outer container; a product of note for this style is Ferrero's 'Kinder Joy' Other products contain the toy inside a plastic container, often egg shaped or round in nature, and partially or completely encapsulate the container in chocolate; references for this style are Ferrero's 'Kinder Surprise', Candy Treasure LLC's 'Choco Treasure'—US20110123687, and Yowie Group Ltd's 'Yowie'—US20170050789A1.

Due to Food and Drug Administration (FDA) regulations, in the U.S. it is prohibited to entirely conceal any non-nutritive product within a candy coating, due to § 402(d)(1) of the Federal Food, Drug, and Cosmetic Act. This results in Kinder Surprise's design of an encapsulated, non-edible, toy container to be unavailable in the U.S. market. In the "Choco Treasure" and "Yowie" products, the capsule visibly protrudes through the confectionery layer, making it obvious to the consumer that there is a non-edible component inside. These products and many similar products all use chocolate as the confectionery layer.

Previous combinations of an edible material and a non-edible container have a number of shortcomings. For example, existing combinations of a confectionery edible material and a non-edible container are typically limited to chocolate as the confectionery. Compared to gelatine-based confectioneries such as gummy, chocolate is less flexible, and more brittle. Consumption of chocolate confectionery encapsulating a non-edible container typically involves fragmentation of the confectionery, and chocolate can partially melt from contact with heat from the user's fingers, adversely impacting the user's experience. Chocolate also can fragment or deform prior to consumption by the user. In addition, chocolate typically has one of only three colours: white, brown and black, and a limited flavour experience. Adding other colours to this limited colour palette of chocolate is difficult because addition of even small quantities of water to melted chocolate can disrupt the delicate balance of ingredients and form a gritty rough mass. In addition, many people adversely react to chocolate, such as by an allergic reaction to one or more ingredients. Thus, there is a need for alternative confectionery products for coating a non-edible container that can expand on the limited colour palette of chocolate, provide for alternative user experiences to interact with the confectionery, exhibit increased physical stability of the confectionery, and allow for consumption of confectionery by chocolate-adverse consumers.

Gummy confectionery is vibrant and can be readily prepared in different colours and flavours. However, current gummy confectionery products are not manufactured in a way that can accurately accommodate a partially, or fully, encapsulated solid object. Most gummy products are solid or have liquid centres. In 3D gummy manufacturing, gummy is loosely dripped into a mould, and gravity and vibration can settle the shape. No product in which gummy is formed around a solid non-edible object exits, nor is a process for preparing such a product known. There exists a need for a confectionery coated container that follows the legal standards in a safe and accessible form, as well as exploits other confectionery materials as the outer layer compared to traditional products. There exists a need for a gummy confectionery-coated non-edible container that utilises an injection moulding production process to conform the confectionery to a non-edible container and allows spatial control over attributes of distinct sections of gummy confectionery product including, for example, attributes selected from among size, position, thickness, colour, flavour and texture.

SUMMARY OF THE INVENTION

Accordingly, the present invention is directed to a gummy confectionery-coated object that obviates one or more of the limitations and disadvantages of the related art. In some embodiments, the present invention is directed to a gummy confectionery-coated non-edible container. Methods of manufacturing the gummy confectionery-coated non-edible object of non-edible container are also provided.

It is an objective of this invention to form the layer of gummy such that it may partially encapsulate the non-edible container to comply with FDA safety regulations when required. For purposes of this description, 'encapsulation' is defined by the non-edible container being completely covered by the gummy layer, whereas 'partial encapsulation' refers to incomplete coverage.

Furthermore, it is an objective of this invention to comprise the confectionery layer of multiple sections that are separable from adjacent sections by various physical features, such as a perforated line, a groove, an indentation, or a continuous vacancy, to achieve the aforementioned disclosure of the non-edible container to the consumer.

Furthermore, it is an objective of this invention to provide a method of manufacturing a gummy confectionery-coated non-edible object. This method can yield products that include the aforementioned features within, and between, each section of gummy with the use of an external mould which locates the non-edible container during the forming process.

An additional objective of this invention is to form the confectionery layer in such a method as to loosely adhere it to a surface of the non-edible container, wherein 'loosely adhered' is defined by: 'adhered' referring to the gummy layer's capacity to remain in place on the container surface due to surface-to-surface adhesion, rather than protrusions from the non-edible container, connections to adjacent sections, or a combination thereof, that may traditionally provide support for other forms of confectionery; while 'loosely' refers to the ease in which the layer may be removably peeled from the container surface, wherein the layer is removed in a fashion that does not require a tool, and is reasonable for a child to remove with their fingers.

Furthermore, it is an objective of this invention to control the surface texture of the non-edible container and/or the formulation of the confectionery to create an experience which does not leave residue or substantially does not leave residue on the non-edible container following the layer being peeled from the surface.

It is also an objective of this invention to control the size and/or physical form of the non-edible container to ensure that it is not a choking hazard to the consumer.

Additional features and advantages of the invention will be set forth in the description which follows, and in part will be apparent from the description, or may be learned by practice of the invention. The objectives and other advantages of the invention will be realised and attained by the structure particularly pointed out in the written description and claims hereof as well as the appended figures.

It is to be understood that both the foregoing general description and the following detailed description are exemplary and explanatory and are intended to provide further explanation of the invention as claimed.

DESCRIPTION OF THE DRAWINGS

The accompanying drawings, which are included to provide further understanding of the invention are incorporated and constitute a part of this specification, illustrate embodiments of the invention and together with the description, serve to explain the principles of the invention.

In the drawings:

FIG. 12 is a three-quarter view of a first half of a mould which comprises a cavity that houses a non-edible object to form gummy confectionery on the outer surface of.

FIG. 13 is a three-quarter view of a second half of a mould which comprises a cavity that houses a non-edible object to form gummy confectionery on the outer surface of.

DETAILED DESCRIPTION OF THE INVENTION

Figure 1:
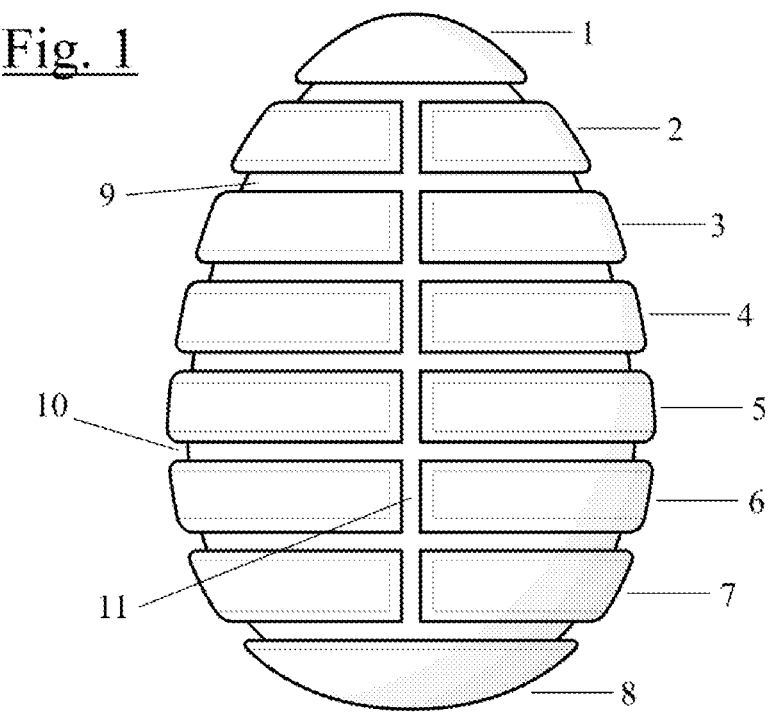
FIG. 1 shows a side view of a preferred embodiment of the invention; a non-edible container with a layer of 8 peelable sections of gummy confectionery.
Figure 2:
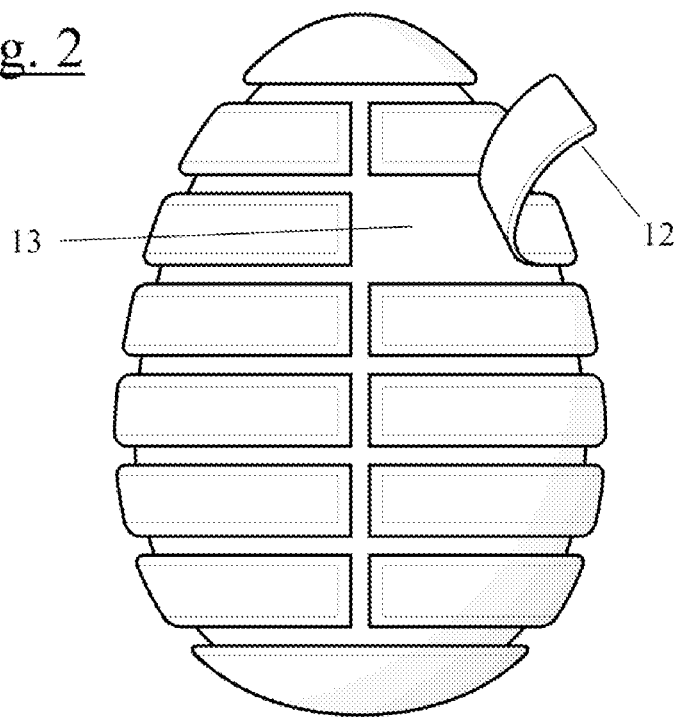
FIG. 2 shows the same embodiment and view of FIG. 1, with one of the 8 sections partially peeled from the surface of the non-edible container.

As used herein, "longitudinal" refers to an axis along the lengthwise direction of a body passing through the centre of gravity.

As used herein, "transverse" refers to an axis along the width of a body, orthogonal to and intersecting the longitudinal axis at the centre of gravity.

The invention as disclosed in its present form, comprises of: A polypropylene non-edible container in the shape of an egg, wherein the longitudinal dimension is longer than its transverse dimension and is rotationally symmetrical about its longitudinal axis; A toy encapsulated within the non-edible container; A peelable layer made up of sections of gummy confectionery on the surface of said non-edible container, including gaps between these sections revealing the non-edible container underneath, wherein the gaps are preferably formed by an outer mould during the confectionery forming process.

Referring to FIGS. 1-5, this embodiment comprises of sections 1, 2, 3, 4, 5, 6, 7, 8 of gummy confectionery loosely adhered to the surface of a non-edible, egg-shaped, container 9, wherein the confectionery layer conforms to its shape. These confectionery sections 1, 2, 3, 4, 5, 6, 7, 8 are separable from adjacent sections by a gap 10 of 0.5 mm-2.5 mm. Each sections 2, 3, 4, 5, 6, 7 include a gap 11, 0.5 mm-2.5 mm in width, to assist with peeling 12 the confectionery from the surface of the container 9. Upon peeling the loosely adhered confectionery layer from the surface of the container, a residue-free finish 13 remains, due to the surface texture of the container 9, the formula of the gummy confectionery, or a combination thereof.

Figure 3:
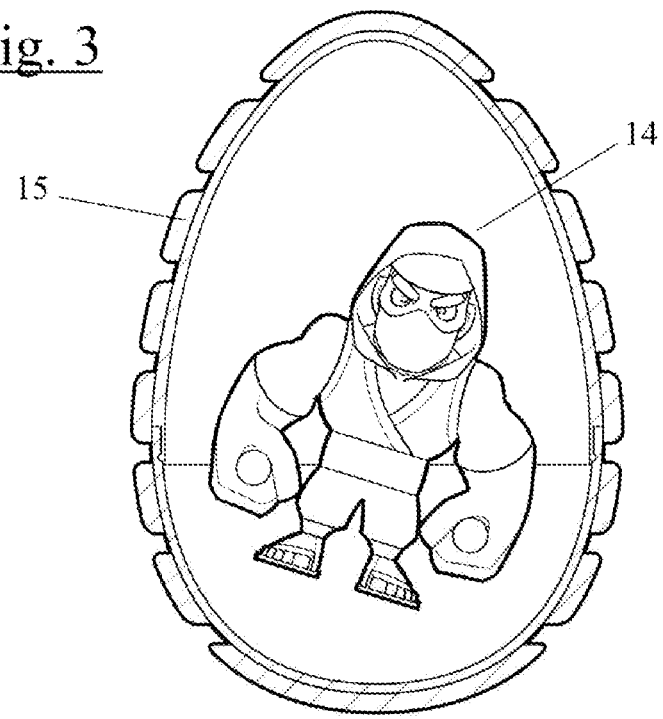
FIG. 3 shows a cross sectional view of the invention's embodiment from FIG. 1, revealing a toy within the non-edible container.

FIG. 3 illustrates a cross-sectional view of the embodiment, revealing the encapsulated toy 14 inside the non-edible container. Additionally, the gummy confectionery layer's profile 15 displays the intended thickness to be a thin layer of 1 mm-5 mm gummy conforming to the supporting curved surface.

Figure 4:
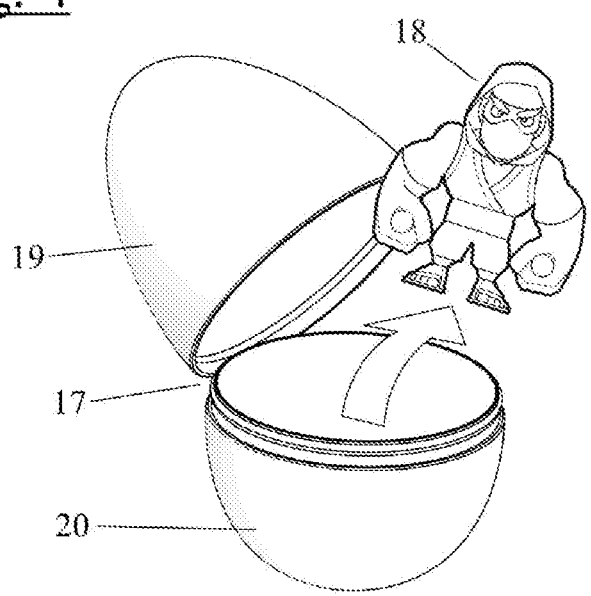
FIG. 4 shows a three-quarter perspective view of the invention's embodiment from FIG. 1 with the confectionery layer removed from the non-edible container, and the toy being removed.

FIG. 4 shows this embodiment's egg capsule 17, with the gummy confectionery removed from the surface, and opened into two halves 19, 20 allowing the toy 18 to be removed.

Figure 5:
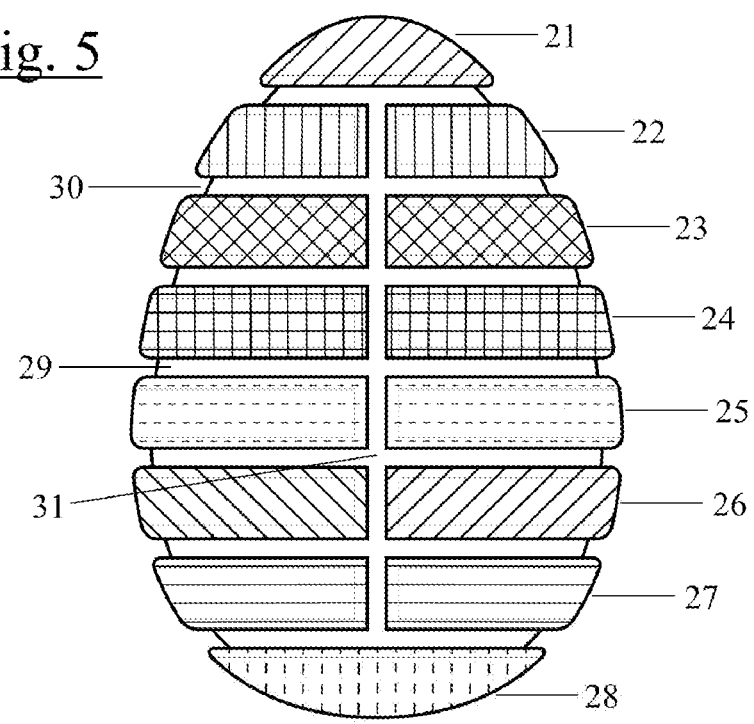
FIG. 5 shows a side view of a similar embodiment to FIG. 1, wherein the sections of removable gummy have unique colours from one another.

FIG. 5 displays a preferred design of the invention's present embodiment, wherein each of the gummy confectionery sections 21, 22, 23, 24, 25, 26, 27, 28 are individually coloured. Furthermore, each of these uniquely coloured sections are uniquely flavoured. For example, the flavours for such sections could be any of the following: cherry, strawberry, orange, pineapple, lemon, lime, apple, raspberry, grape, watermelon, mango, bubble gum, pink grapefruit, cola, chocolate, or a combination thereof.

The embodiment of the invention illustrated in FIG. 5 also displays the key features from FIGS. 1-4 of: sections of gummy confectionery loosely adhered to the surface of a non-edible, egg shaped, container 29 containing a toy, with a gap 30 between each section, and a gap 31 to assist with peeling said sections.

Figure 6:
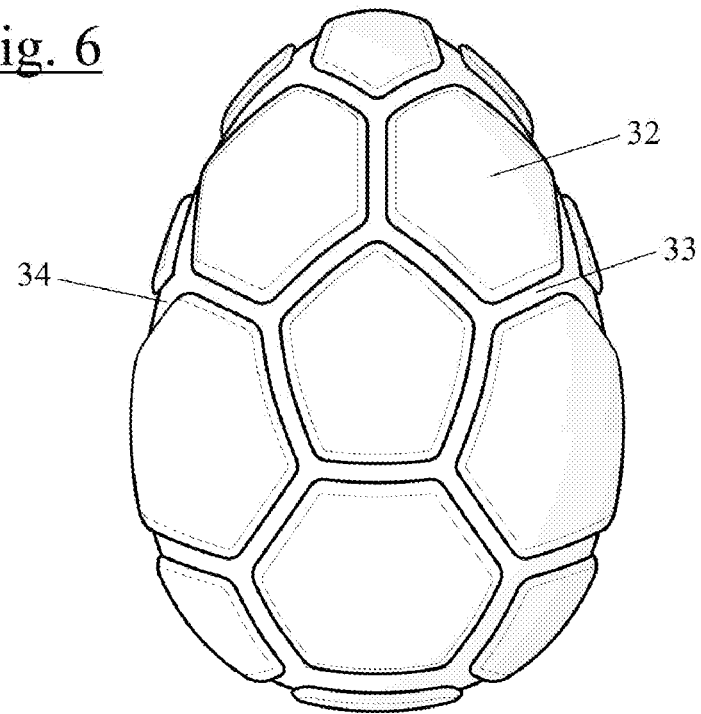
FIG. 6 shows a side view of an alternative embodiment of the invention, with an example of potential shapes of gummy confectionery sections.

Referring to FIG. 6, this embodiment displays potential for alternative designs formed by the gummy confectionery sections 32, such as pentagons and hexagons, while still featuring the gaps 33 between adjacent shapes to reveal the non-edible container 34.

Figure 7:
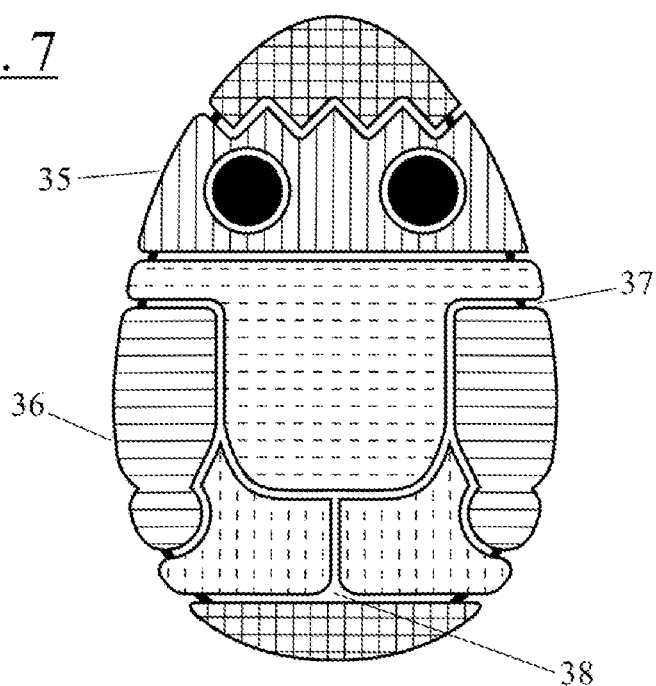
FIG. 7 shows a side view of an alternative embodiment of the invention, wherein the sections of gummy form the design of a character on the surface of a non-edible container.

Referring to FIG. 7, this embodiment further displays alternative designs, that conform to the non-edible container 38, using various section shapes. Sections, separable by gaps 37, may form the design of objects, landscapes, or, in this embodiment, a character wherein the sections 35 may represent heads, arms and other features. Additionally, colour 36 may be used to add to the design cohesion between sections, wherein similar sections may share a colour and flavour, such as left and right arms, however differing sections such as hair may be a different colour and flavour.

Figure 8:
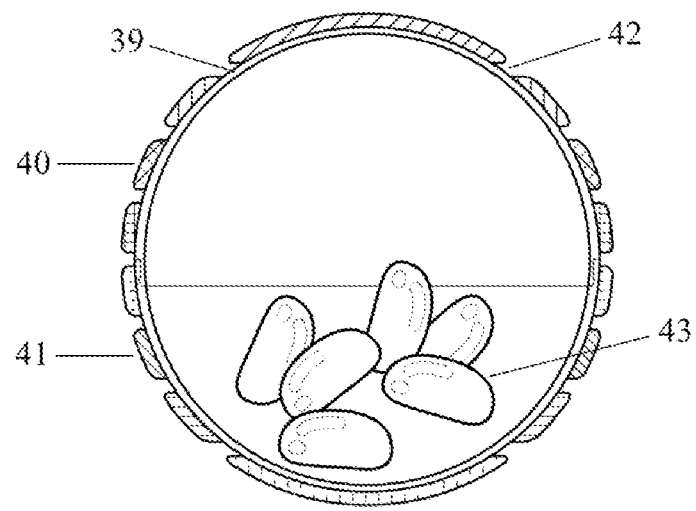
FIG. 8 shows a cross sectional view of an alternative embodiment of the invention, wherein the non-edible container's shape may vary, such as a sphere, and/or the contents of the container may be food or other non-toy products.
Figure 9:
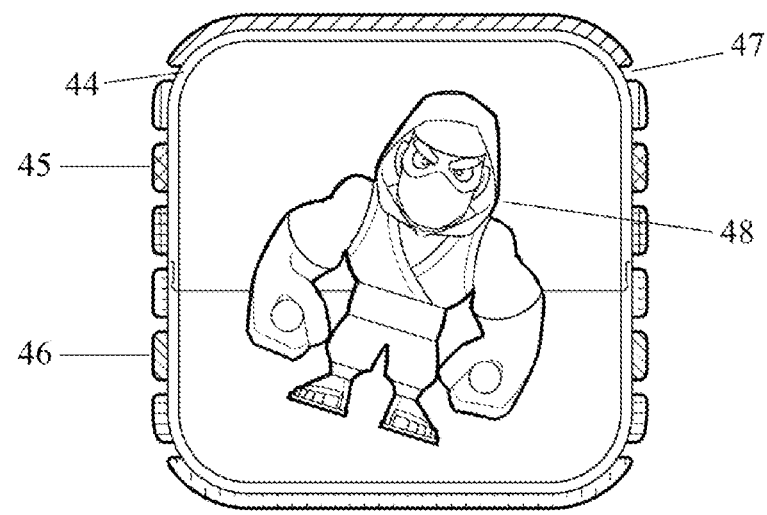
FIG. 9 shows a cross sectional view of an alternative embodiment of the invention, wherein the non-edible container is a cube shape. An encapsulated toy is also revealed within the non-edible container.

Referring to FIGS. 8 and 9, these illustrations display embodiments of the invention wherein the non-edible container may be alternative shapes, such as a sphere 39, a cube 44, or any other shape that is beneficial to the product design. These embodiments would preferably support one or more sections 40, 45 of confectionery, each with a unique colour & flavour 41, 46. The section or sections could also comprise features within the section, to assist with peeling, and be separable from any adjacent sections by a gap 42, 47 or alternative features.

Furthermore, whereas FIG. 9 shows an encapsulated toy 48 within the non-edible container 44, FIG. 8 shows an embodiment of the invention wherein the encapsulated material 43 within the container 39, is not a toy, but alternative items such as jelly beans, chocolate, gummy or other food products.

Figure 10:
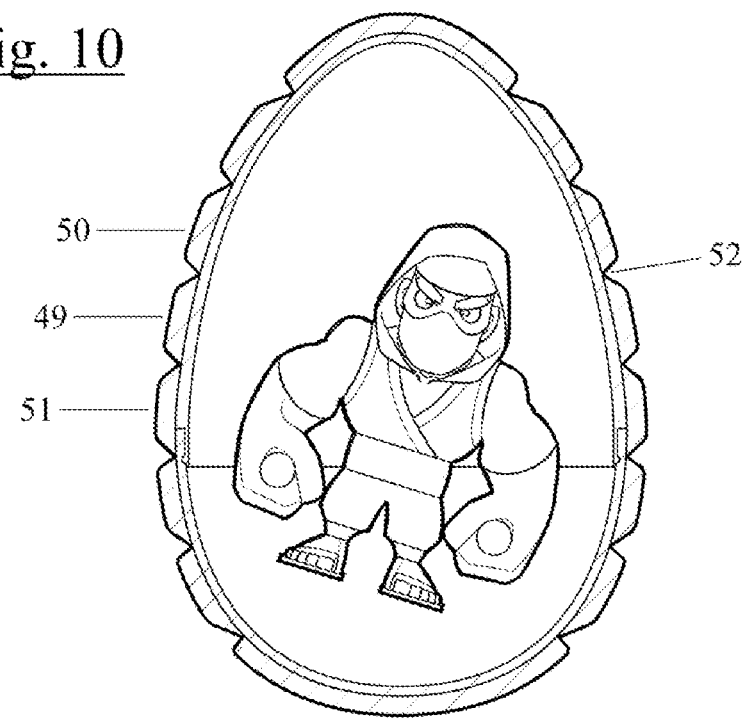
FIG. 10 displays a cross sectional view of an alternative embodiment similar to FIG. 3, wherein the peelable sections of gummy confectionery are connected by an indented groove to assist with separation, instead of a gap.

FIG. 10 displays an alternative embodiment of the present invention wherein each independently removable section 49 is separable from adjacent sections 50, 51 by indented grooves, such as a V-shaped indentation 52.

Figure 11:
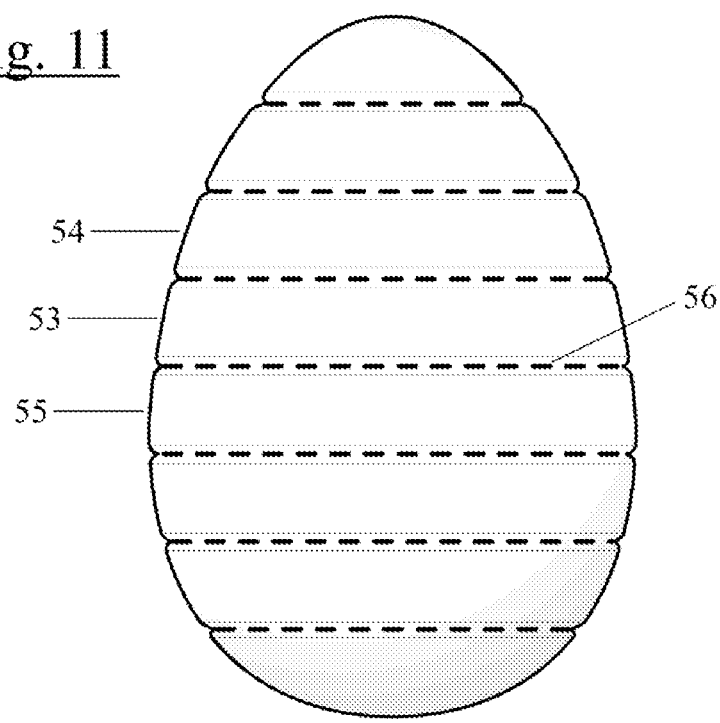
FIG. 11 is a side view displaying an alternative embodiment similar to FIG. 1, wherein the peelable sections of gummy confectionery are connected by a perforated line to assist with separation, instead of a gap.

FIG. 11 illustrates an embodiment showing an alternative form of the independently removable sections wherein each section 53 is separable from adjacent sections 54, 55 by a perforated tear line 56.

Referring now to FIGS. 12 to 17, these figures illustrate the method for producing a gummy confectionery-coated non-edible object. Additionally, alternative embodiments of this method are shown.

Figure 12:
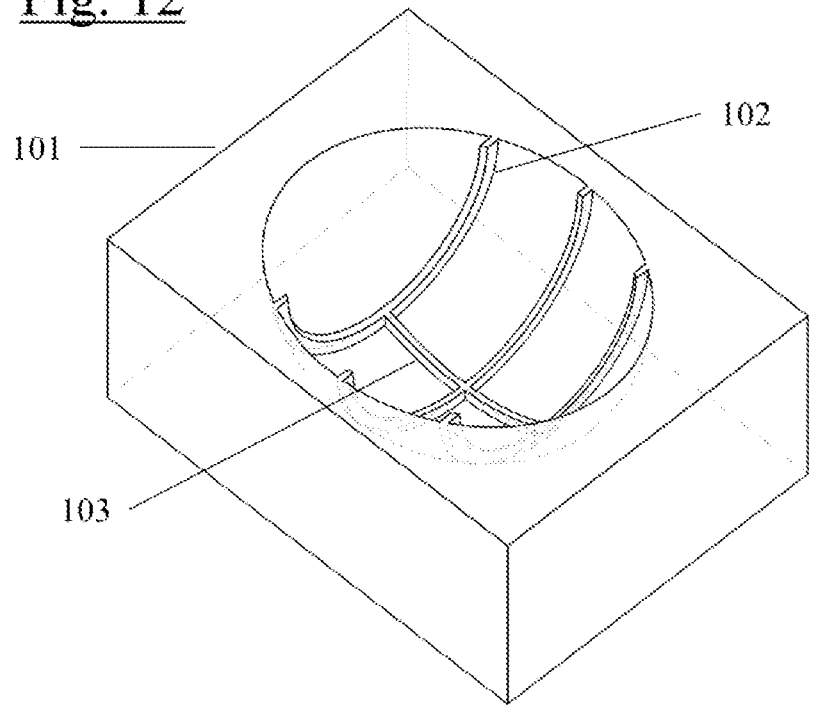

FIG. 12 displays a first half 101 of a mould that is used to prepare the aforementioned preferred embodiments of a gummy confectionery-coated non-edible container similar to FIG. 1. This mould shown comprises an inner surface that injected gummy confectionery conforms to and protrusions offset from said inner surface to locate the non-edible container and form the aforementioned gummy confectionery sections. These protrusions include transverse ribs 102 that separate each section of gummy by a gap 10, and a longitudinal rib 103 that creates a peeling gap 11 to allow the consumer to remove sections of gummy independently.

Figure 13:
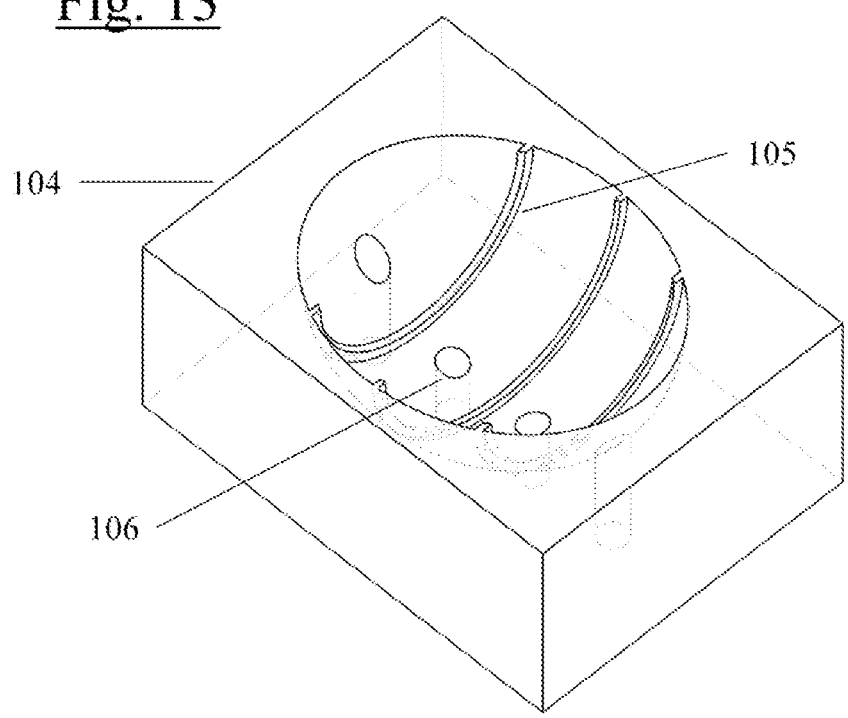

FIG. 13 displays the second half 104 of a mould designed to mate with the first half 101 from FIG. 12. The transverse ribs 105 align with the ribs 102, although this side does not feature a longitudinal rib. The second half 104 features injection holes 106, to inject the gummy confectionery into, with this embodiment having 1 injection hole for each section of gummy.

Figure 14:
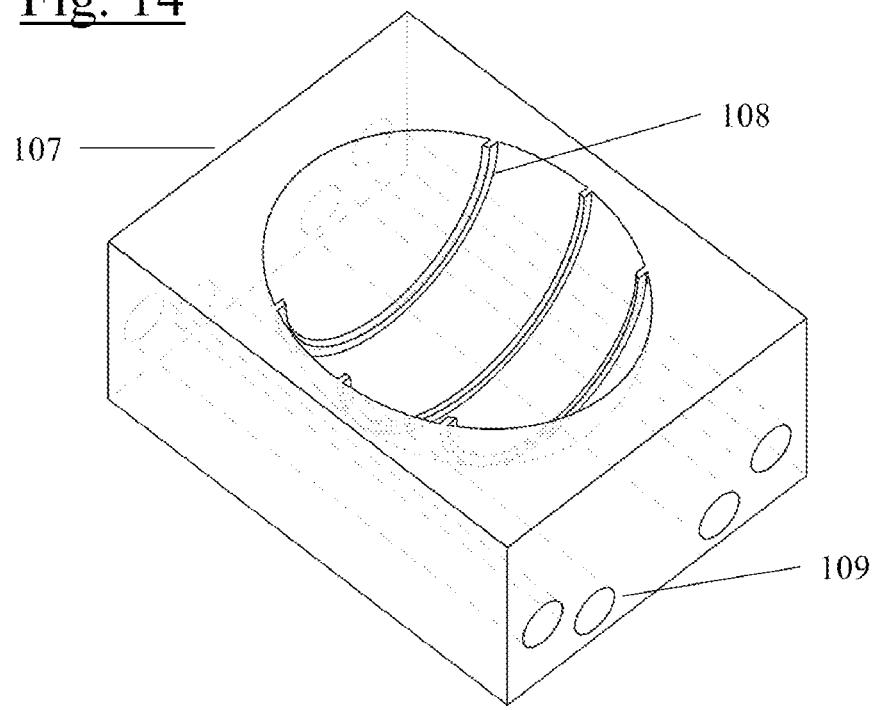
FIG. 14 shows three-quarter view of an alternative embodiment of FIG. 12, wherein the mould comprises water channels through the body of the mould to cool the gummy confectionery after injecting the confectionery into the mould.

FIG. 14 illustrates an alternative embodiment of a first half 107 of a mould that could mate with the second half 104 from FIG. 13. This mould does not contain a longitudinal rib yet retains the transverse ribs 108 to provide multiple cavities for receiving gummy. This mould additionally comprises cooling channels 109 within the body of the mould that may allow for rapid cooling of the mould, and consequent cooling of the gummy confectionery. Alternatively, these cooling channels could also be designed to receive refrigerant, coolant liquid, or cold air.

Figure 15:
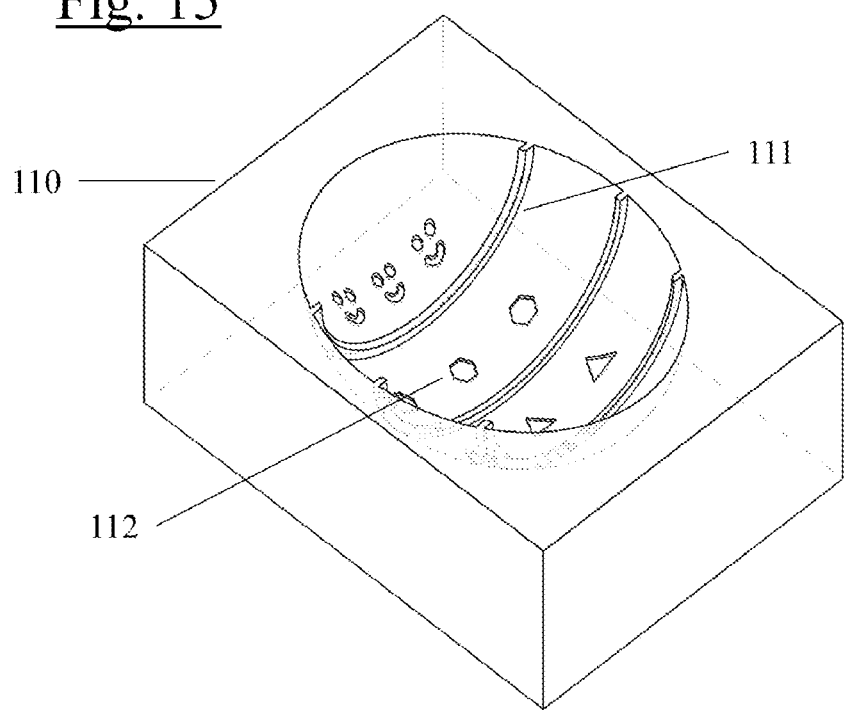
FIG. 15 is a three-quarter view of an additional alternative embodiment of the mould half of FIG. 12, wherein the inner surface of the mould has shapes and icons debossed into it.

FIG. 15 further displays an alternative embodiment of a first half 110 of a mould that could mate with the second half 104 from FIG. 13. This mould half also retains multiple transverse ribs 111 for locating the non-edible container and creating discrete cavities, however the inner surface of the mould comprises debossed shapes 112. This illustrates the ability to form complex geometry and texture into the formed gummy sections such as polygons, letters, symbols, icons, fruit, or any other features that may improve the sensation or appearance of the gummy.

Figure 16:
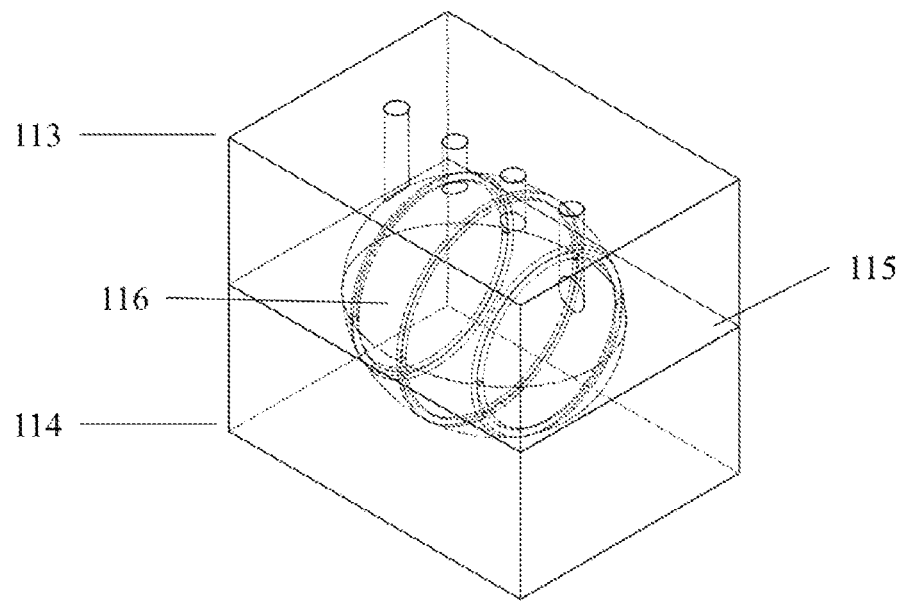
FIG. 16 shows a three-quarter view of the mould halves from FIGS. 12 and 13 mated together, forming the non-edible object-housing cavity.

FIG. 16 displays a preferred embodiment of a closed mould comprising a first 113 and second 114 half mated at a coupling face 115. These two halves, when mated, form an interior cavity 116 capable of receiving a non-edible object that the protrusions and/or inner surface have been contoured to and/or offset from.

Figure 17:
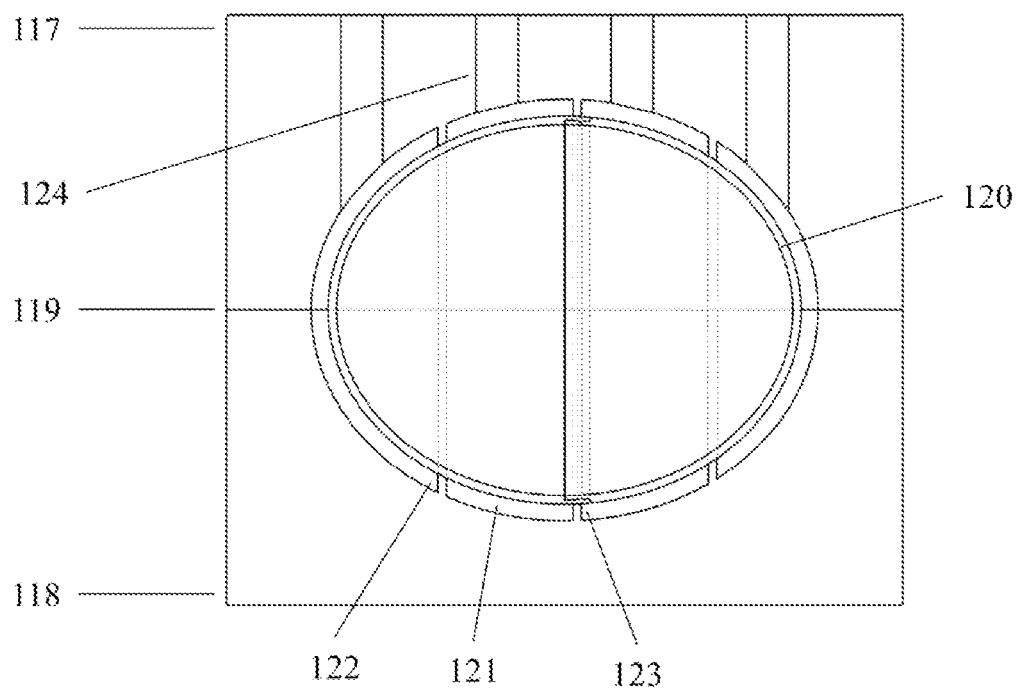
FIG. 17 is a cross-sectional side view of the mated mould halves from FIG. 16 with a non-edible container located within.

FIG. 17 further shows a cross-sectional view of two mould halves 117, 118 mated at a coupling plane 119 containing a non-edible object, wherein the object is a non-edible container 120. This view shows the fixed location of the non-edible container within the mould's contoured ribs and offset inner surface, and the separation of discrete cavities between the transverse ribs. The injection hole 124 allows for gummy to be injected into the cavity 121 between the transverse ribs 122, 123. The inner surface of the mould halves can be seen to be contoured and offset from the outer surface of the non-edible container, providing a vacancy with uniform thickness, wherein the resulting injected gummy sections would have uniform thickness.

Figure 18:
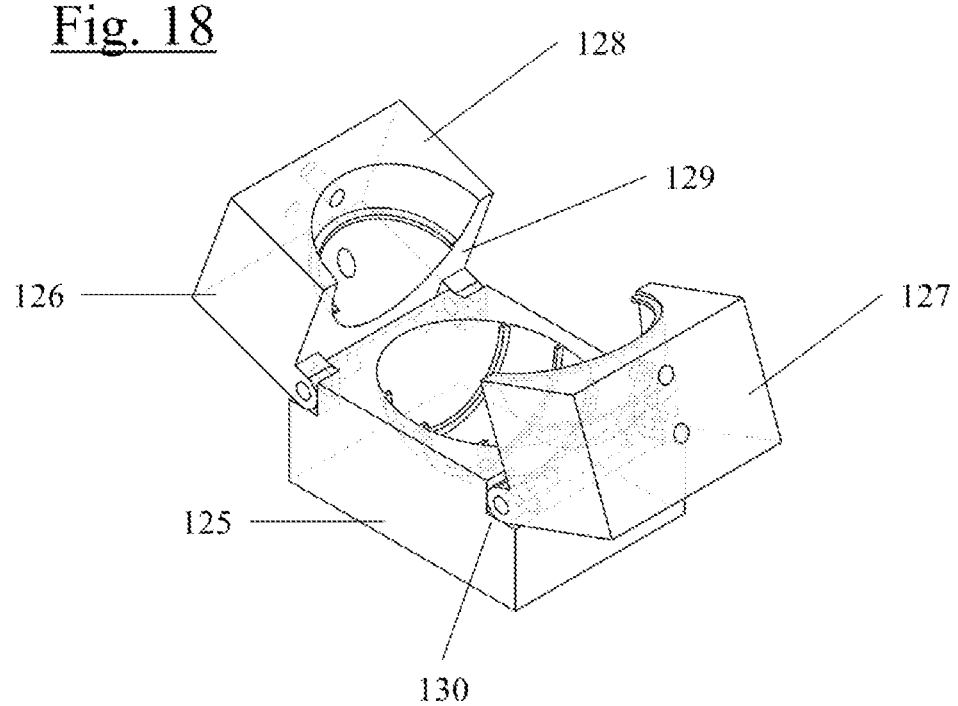
FIG. 18 shows a three-quarter view of an alternative embodiment of the mould from FIG. 16, wherein the second half is divided into two sections, through its transverse axis.
Figure 19:
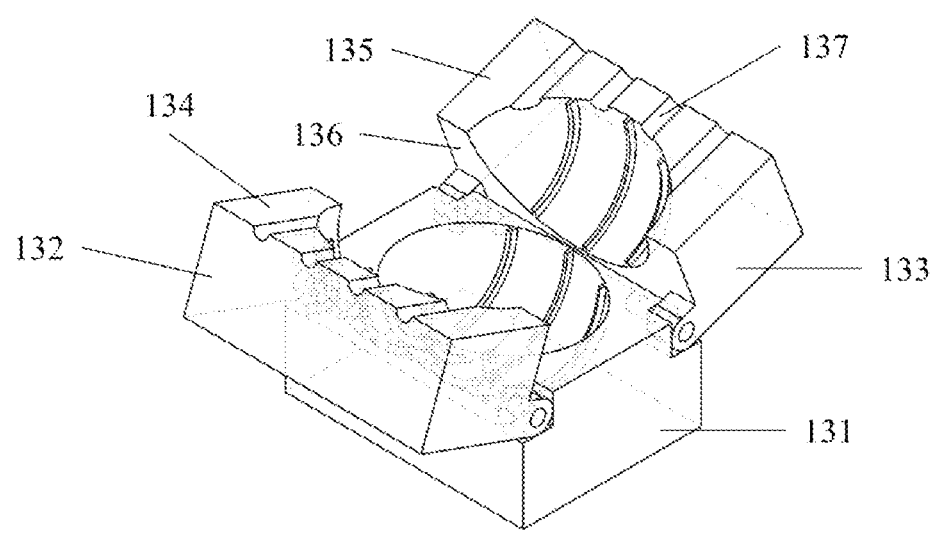
FIG. 19 shows a three-quarter view of an additional alternative embodiment of the mould from FIG. 16, wherein the second half is divided into two sections, through its longitudinal axis.

Referring now to FIGS. 18 and 19, in some alternative embodiments, the aforementioned second half of the mould could be further divided into two parts, through its longitudinal or transverse axis, wherein the dividing plane is perpendicular to the mating plane between the two halves. This division of the second half could produce a folding mould, wherein the mould comprises of a first half, and a second and third section that make up the second half, wherein these second and third sections are each independently connected, via a hinge or a linear rail, to the first half. Furthermore, this division of the second half could be useful to ensure a lower surface area for the gummy confectionery to stick to compared to the first half when opening the mould after cooling. This would provide a more stable mould release process, wherein the gummy confectionery coated non-edible object remains in the first half of the mould upon opening the closed mould to remove the gummy confectionery-coated non-edible object.

FIG. 18 displays an alternative embodiment of the mould in FIG. 16, wherein the mould comprises a first half 125 and a second half that is divided into a first 126 and second 127 section through its transverse axis. Upon closing the mould, each section of the second half would mate to the other with a face 128, and with the first half of the mould with a face 129, wherein faces 128 129 are perpendicular. Each section of the second half in this embodiment is connected to the first half via a hinge 130.

FIG. 19 illustrates an additional alternative embodiment of the mould in FIG. 16, wherein the mould comprises of a first half 131 and a second half divided into a first 132 and second 133 section and connected via a hinge as in the embodiment of FIG. 18, however, the second half in this embodiment is divided through its longitudinal axis. Each section of the second half mates with the other with the faces 134 135 and with the first half of the mould with the face 136, wherein the faces 134 135 are perpendicular to 136. This embodiment additionally divides the injection holes 137 which seal upon closing of the mould sections.

The present and alternative embodiments of the mould, for example, could be mated together using mechanisms such as a hinge, bolts, magnets, automated power screws, cam locks, linear slide rails or other well-known clamping methods.

The mould can be prepared from any suitable material, such as, for example, aluminium, stainless steel, silicone, or any combination thereof. Selection of a suitable material is within the ability of the skilled artisan. Characteristics of the material that can be considered include, for example, thermal properties, machining time, and durability. For example, a durable material can minimize damage to the mating surfaces after repeated clamping of the two mould halves.

The moulds for use in the methods provided herein can be coated with a permanent or temporary coating to decrease adherence of gummy confectionery to the mould surface. Decreasing adherence of gummy confectionery can facilitate release of the gummy confectionery-coated non-edible object from the mould. Examples of coatings that can be applied to the mould surface include Polytetrafluoroethylene (PTFE), Perfluoroalkoxy alkane (PFA), Fluorinated Ethylene Propylene (FEP), Ethylene Tetrafluoroethylene (ETFE), carnauba wax, corn oil, palm oil, or coconut oil. In some methods provided herein the mould can be sandblasted, or otherwise roughened, before applying a permanent coating.

A gummy confectionery-coated non-edible container can be prepared by injection moulding gummy into a mould housing a non-edible container. In an exemplary embodiment, the gummy confectionery-coated non-edible container can comprise 8 sections of independently separable gummy coating, an egg-shaped non-edible container, and a surprise toy therein. Each confectionery section can contain a fruit flavour and a corresponding colour. The non-edible container can be made of polypropylene (PP) with a glossy white colour. Two sections of the non-edible container can be attached by a snap joint to form a sealed container. The gummy confectionery coating can be applied by hot injection moulding within a PTFE coated mould, wherein the injection of gummy is controlled with a pump with adequate volume accuracy. After injection of hot gummy confectionery, the gummy confectionery can be cooled by cooling the mould with cold air or water.

The gummy confectionery can be prepared to meet an injection temperature suitable to control key parameters that may affect the forming process such as viscosity, or heat energy. As the temperature is increased, the viscosity decreases which may require lower injection pressure, however higher temperature may also result in longer cooling time of the mould and gummy confectionery layer.

Once the gummy is sufficiently set, the mould can be opened to remove the gummy confectionery-coated container where it can be left to dry in a humidity-controlled environment. This drying process can be used to achieve desired gummy texture and reduce the adhesion of the outer surface of the gummy layer. Once dried, a fine layer of vegetable oil & carnauba wax solution can be applied to improve glossiness and further reduce stickiness adhesive properties of the gummy surface.

The invention has been described with examples relevant to its current form, however, potential embodiments will include any form that is within the scope of the appended claims. It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An article comprising a layer of gummy confectionery adhered by an injection molding process to an outer surface of a non-edible container, wherein:
   the layer of gummy confectionery comprises a plurality of sections separable by indented grooves, perforations, gaps or a combination thereof,
   the layer of gummy confectionery conforms to a shape of an outer surface of the non-edible container, partially encapsulating the non-edible container, and
   the plurality of sections are each individually removably peelable from the outer surface of the non-edible container.

2. The article as claimed in claim 1, wherein the confectionery layer partially, or completely, covers the non-edible container.

3. The article as claimed in claim 1, wherein the non-edible container is in an egg-like shape.

4. The article as claimed in claim 1, wherein the non-edible container contains a toy, and the contained toy is not revealed until said container is opened.

5. The article as claimed in claim 1, wherein the gummy confectionery layer thickness is 1 mm-5 mm.

6. The article as claimed in claim 1, wherein the gummy confectionery layer is sufficiently flexible such that it can be removed from the non-edible container without sustaining brittle fragmentation.

7. The article as claimed in claim 1, wherein each section of the plurality of sections is removable independently of any other sections.

8. The article as claimed in claim 7, wherein the number of independently removable sections is 2 to 10.

9. The article as claimed in claim 1, wherein the layer of gummy confectionery comprises two or more colors.

10. The article as claimed in claim 7, wherein the gummy confectionery comprises more than one color, and wherein each independently removable section or sections is a single color.

11. The article as claimed in claim 7, wherein the gummy confectionery comprises of more than one flavor, wherein each independently removable section or sections is a single flavor.

12. The article as claimed in claim 1, wherein the gummy confectionery comprises one or more of the following gelling agents: bovine gelatine, porcine gelatine, fish gelatine, modified starch, pectin, carrageenan, and agar.

13. The article as claimed in claim 1, wherein the gummy confectionery layer comprises sorbitol.

14. The article as claimed in claim 1, wherein the gummy confectionery layer comprises maltitol.

15. The article as claimed in claim 1, wherein the non-edible container contains a toy or a food item.

16. The article as claimed in claim 1, wherein the plurality of sections are separable by gaps, and the non-edible container is visible through the gaps.

* * * * *